(12) United States Patent
Schudt

(10) Patent No.: US 9,541,215 B2
(45) Date of Patent: Jan. 10, 2017

(54) ELECTROMAGNETIC ACTUATOR

(71) Applicant: Robert Bosch GmbH, Stuttgart (DE)

(72) Inventor: Klaus Schudt, Nordheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/652,496

(22) PCT Filed: Oct. 17, 2013

(86) PCT No.: PCT/EP2013/071692
§ 371 (c)(1),
(2) Date: Jun. 16, 2015

(87) PCT Pub. No.: WO2014/095117
PCT Pub. Date: Jun. 26, 2014

(65) Prior Publication Data
US 2015/0332834 A1 Nov. 19, 2015

(30) Foreign Application Priority Data

Dec. 17, 2012 (DE) .................. 10 2012 223 430

(51) Int. Cl.
*H01F 5/00* (2006.01)
*F16K 31/06* (2006.01)
(Continued)

(52) U.S. Cl.
CPC ............. *F16K 31/06* (2013.01); *H01F 7/081* (2013.01); *H01F 7/121* (2013.01); *H01F 7/127* (2013.01);
(Continued)

(58) Field of Classification Search
CPC ...... F16K 11/07; F16K 11/0708; F16K 31/02; F16H 61/02; F16H 61/0251; F16H 2061/0253; F16H 61/065; F16H 61/0206; B01D 29/00; B01D 29/0095; B01D 35/02; H01F 7/1607; H01F 7/081; H01F 7/121; H01F 7/16; H01F 7/08; H01F 2007/062
(Continued)

(56) References Cited

U.S. PATENT DOCUMENTS 4,109,221 A * 8/1978 Pauli .................... H01F 7/1607
335/251
4,242,606 A * 12/1980 Nonnenmann ....... H01F 7/1607
310/12.01
(Continued)

FOREIGN PATENT DOCUMENTS

DE    28 09 975       9/1979
DE    10 2006 011 078   9/2007
(Continued)

OTHER PUBLICATIONS

International Search Report for PCT/EP2013/071692, dated Feb. 28, 2014.

*Primary Examiner* — Shawki S Ismail
*Assistant Examiner* — Lisa Homza
(74) *Attorney, Agent, or Firm* — Norton Rose Fulbright US LLP; Gerard Messina

(57) ABSTRACT

An electromagnetic actuator includes: a magnetic coil, which has a coil form having a coil winding situated on it and a central clearance extending in an axial direction; an armature slidably situated in the central clearance; a terminal piece situated on an axial end of the coil form, in which an actuating element is slidably supported in the axial direction. The armature is movable by an actuation of the magnetic coil such that a force applied by the armature is transmitted to the actuating element. The actuating element is configured in two parts, including an actuating pin supported in the terminal piece and a separator fixedly connected to the actuating pin on an end section of the actuating pin protrud-
(Continued)

ing from the terminal piece in the direction of the armature and which is acted upon by the armature when the magnetic coil is actuated.

10 Claims, 1 Drawing Sheet

(51) Int. Cl.
  *H01F 7/08* (2006.01)
  *H01F 7/121* (2006.01)
  *H01F 7/127* (2006.01)
  *H01F 7/16* (2006.01)
  *H01F 7/06* (2006.01)

(52) U.S. Cl.
  CPC ....... *H01F 7/1607* (2013.01); *H01F 2007/062* (2013.01)

(58) Field of Classification Search
  USPC .......................................................... 335/282
  See application file for complete search history.

(56) References Cited

U.S. PATENT DOCUMENTS

| | | | | |
|---|---|---|---|---|
| 5,447,288 | A * | 9/1995 | Keuerleber | G05D 16/2013 251/129.16 |
| 5,752,689 | A * | 5/1998 | Barkhimer | F16K 31/0665 239/585.4 |
| 5,895,026 | A * | 4/1999 | Linkner, Jr. | B60T 8/3615 251/129.15 |
| 5,915,416 | A * | 6/1999 | Okazaki | F16K 31/0637 137/596.17 |
| 6,124,775 | A * | 9/2000 | Linkner, Jr. | B60T 8/363 251/129.15 |
| 6,144,275 | A * | 11/2000 | Hirata | H01F 7/06 251/129.15 |
| 6,152,422 | A * | 11/2000 | Staib | F16K 31/0637 137/596.17 |
| 6,273,122 | B1 * | 8/2001 | Schudt | F16H 61/0009 137/15.09 |
| 6,318,703 | B1 * | 11/2001 | Goossens | B60T 8/363 251/129.15 |
| 7,905,249 | B2 * | 3/2011 | Mayr | F16H 61/0251 137/596.17 |
| 8,004,378 | B2 * | 8/2011 | Wanner | F02N 15/067 335/266 |
| 8,342,479 | B2 * | 1/2013 | Chuang | F16K 1/38 251/129.15 |
| 2002/0149456 | A1 * | 10/2002 | Krimmer | H01F 7/124 335/220 |
| 2008/0265190 | A1 * | 10/2008 | Fleischer | G05D 16/2013 251/65 |
| 2009/0039992 | A1 * | 2/2009 | Ryuen | H01F 7/081 335/255 |
| 2009/0072181 | A1 * | 3/2009 | Zweigle | F16K 27/003 251/367 |
| 2009/0090881 | A1 * | 4/2009 | Mueller | F15B 13/0405 251/129.14 |
| 2014/0028423 | A1 * | 1/2014 | Matsumoto | H01F 7/1607 335/282 |
| 2015/0279538 | A1 * | 10/2015 | Toda | H01F 7/081 475/31 |
| 2015/0354715 | A1 * | 12/2015 | Schudt | F16K 11/0708 210/435 |
| 2016/0024976 | A1 * | 1/2016 | Lang | F01L 1/34 123/90.12 |
| 2016/0102755 | A1 * | 4/2016 | Mueller | F16H 61/0276 137/382 |
| 2016/0108878 | A1 * | 4/2016 | Falaschi | B01D 35/02 239/584 |

FOREIGN PATENT DOCUMENTS

| | | |
|---|---|---|
| DE | 10 2007 047422 | 4/2009 |
| WO | WO 99/11918 | 3/1999 |
| WO | WO 2011/012 366 | 2/2011 |

\* cited by examiner

ELECTROMAGNETIC ACTUATOR

BACKGROUND OF THE INVENTION

1. Field of the Invention

The present invention relates to an electromagnetic actuator having a two-part actuating element.

2. Description of the Related Art

In modern passenger-car automatic transmissions, hydraulically actuated clutches are used for changing gears. In order for the shifting operations to proceed smoothly and imperceptibly for the driver, it is necessary to adjust the hydraulic pressure on the clutches in accordance with predefined pressure ramps with high pressure precision. The pressure required for this purpose may be provided with the aid of hydraulic slide valves, as they are known for example from published international patent application publication WO 2011/012366 A1. These slide valves may be actuated either via a pilot valve or directly via an electromagnetic actuator. Electromagnetic actuators may moreover also be used for actuating shift valves, developed as seated valves, in automatic transmissions or other applications. The flawless functioning and installation of electromagnetic actuators in an automatic transmission requires special measures. Often, for example, a force transmission element is required for actuating a slide valve, which is normally called an actuating element or actuating pin.

Published German patent application document DE 10 2006 011 078 A1 describes an electromagnetic actuator, which is called a solenoid in this document, which has a magnetic coil, which has a coil form having a coil winding situated on it and a central clearance extending in an axial direction, in which an armature is situated sliding in a bearing sleeve. On an axial end of the coil form, a terminal piece covering the central clearance is developed, which is made up of a cone and a cone disk. An actuating rod is supported in a sliding manner in the terminal piece, the armature being movable by an actuation of the magnetic coil such that a force applied by the armature of the electromagnetic actuator is transmittable to the actuating. rod. In the known electromagnetic actuator, the actuating rod is connected in a fixed manner to the armature by a press-fit connection.

The actuating rod known from Published German patent application document DE 10 2006 011 078 A1 is fitted with a collar that is produced by an elaborate cutting process. Since the collar is not formed while the actuating rod is mounted on the armature, but must be produced ahead of time by cutting, it is not possible flexibly to adapt during installation the length of the actuating rod that is protruding from the armature to the individual conditions. The collar acts at the same time also to prevent a magnetic bonding in that, by situating the collar between the pole of the armature and an opposite pole of the terminal piece, the surfaces of the two poles are prevented from touching each other. Since the collar for this purpose must be made from non-magnetic material, the entire actuating rod must also be made from non-magnetic material, which has the consequence that the material of the actuating rod cannot be selected in optimized fashion with respect to force transmission capacity and wear with regard to stability and hardness. Moreover, the actuating element made from a non-magnetic material has a greater thermal expansion than the terminal piece made from magnetic material, in which the actuating rod is supported in a bore in sliding fashion. This has the consequence that with rising temperature the running clearance required by the actuating rod is reduced and particles present in a gap between the bore and the actuating rod may cause the actuating rod to seize.

Since the collar furthermore has only a very small elasticity of its own, the impulse forces occurring when there is impact stress become very high. In order to avoid wear, the actuating rod must therefore be designed as having a relatively large diameter in order to keep the occurring surface pressures low. Due to the size of the actuating rod, the actuating rod is relatively expensive and causes a considerable pump effect when the armature moves in the bore, which may transport contaminated oil into the magnet.

Because of the fixed connection between the armature and the actuating rod, the sleeve bearing of the actuating rod must additionally absorb magnetic transverse forces, which results in an increased magnetic force hysteresis. In the known design approach there is additionally the danger that the manufacturing-related eccentricity between the bearing points on the armature and on the actuating rod may cause jamming. In order to prevent the moving parts from jamming, the sleeve bearing of the actuating rod must be designed to be relatively short so as to allow for inclinations, which, if necessary, are able to compensate for a manufacturing-related eccentricity. The short bearing, however, has the disadvantage that dirt-sealing effect is clearly reduced.

The objective of the present invention is to provide an electromagnetic actuator that avoids the disadvantages described above.

BRIEF SUMMARY OF THE INVENTION

The above objective is achieved by an electromagnetic actuator according to the invention, in which a two-part actuating element is provided that has an actuating pin supported in a terminal piece of the magnetic coil as well as a separator, which is fixedly connected to the actuating pin at an end section of the actuating pin protruding from the terminal piece in the direction of the armature and which is acted upon by the armature when the magnetic coil is actuated.

The two-part structure of the actuating element advantageously makes it possible to select different materials for the actuating pin and the separator. Thus the actuating pin may be developed from hardened steel, for example, it being possible to make use of commercially available cost-effective needle rollers made of hardened steel for use in a needle roller bearing. The separator may be advantageously manufactured from non-magnetic steel.

The actuating pin is advantageously not fixedly connected to the armature and has a bearing of its own independently of the bearing of the armature such that no magnetic transverse forces act on the bearing of the actuating pin and no disadvantageous tilting can occur between a bearing point for the armature and a bearing point for the actuating pin.

Advantageously, the actuating element largely seals off the solenoid hydraulically such that gear-wheel abrasion contained in the transmission oil cannot enter into the interior of the solenoid. This seal may be technically implemented as a clearance seal in the form of a clearance fit. For this purpose, it is advantageous that due to the two-part design of the actuating element the sliding bearing clearance may be designed to be long and having a small running clearance. The actuating pin of the actuating element may be advantageously optimized with regard to form and material in that the actuating element is supported in a low-friction and wear-free manner and an impairment of the magnetic force through friction losses is avoided.

Because a relatively hard material may be selected as the material of the actuating pin independently of the design of the separator, the actuating element is able to transmit high forces in the event of quick pressure changes, which arise in the use of the electromagnetic actuator for example in combination with a slide valve by impulse transmissions between the actuating element and the slide valve in dynamic operation.

In the selection of the material of the actuating pin, the material may be advantageously chosen such that the thermal expansion of the actuating pin differs as little as possible from the thermal expansion of the material of the bearing point developed in the terminal piece even when there is little play of the actuating pin in the terminal piece. The terminal piece may be for example a magnetic flow disk of the electromagnetic actuator. The described measure advantageously prevents micro-particles that fit into the clearance such as abrasion and dirt from the transmission oil in the event of temperature change stresses get stuck in the sliding bearing clearance of the actuating element.

It is particularly advantageous that the separator, independently of the material selection for the actuating pin, may be produced from a non-magnetic material, in particular from non-magnetic metal and very particularly from non-magnetic steel. The non-magnetic separator advantageously prevents a magnetic adhesion of the armature on the yoke of the pole tube.

The separator advantageously has at least one laterally projecting shoulder, which limits the maximum displacement path of the actuating pin in the terminal piece by making contact with the terminal piece or a component connected to the terminal piece when the separator is acted upon by the armature. This makes it possible to set the maximum displacement path of the actuating pin. In addition, this ensures that the actuating pin is designed so that is cannot be lost in transport and installation.

In a particularly advantageous exemplary embodiment, the electromagnetic actuator has a separator developed in a cup-shaped manner. The cup-shaped separator may be manufactured cost-effectively for example by deep drawing, a non-magnetic material being preferably used for this purpose in order to prevent magnetic adhesion. The cup-shaped sliding piece advantageously has a high degree of elasticity when force is applied in the axial direction. As a result, the impulse forces in the event of shocks remain advantageously low and the actuating pin and the separator may also be formed by relatively small components.

The actuating pin may be inserted in a very simple manner by one end section into the cup-shaped separator. Particularly advantageously, the cup-shaped separator may be pressed or shrunk onto the actuating pin, a firm connection being thereby achieved between the actuating pin and the separator. After having been pressed on, the separator is thus fastened to the actuating pin in an immovable manner with respect to the maximum forces occurring in operation. The pressed-on cup-shaped separator advantageously acts at the same time as a loss protection so that the actuating pin cannot detach from the magnet in transport.

The cup-shaped separator advantageously has a cylinder sleeve, a bottom and, on its end facing away from the bottom, a laterally projecting collar, which limits the maximum displacement path of the actuating pin in the terminal piece by making contact with the terminal piece or a component connected to the terminal piece when the non-magnetic separator is acted upon by the armature.

The fact that the actuating pin has a length L1 and that the cup-shaped separator is pressed or shrunk onto the actuating pin to such an extent that the distance between the collar and an end of the actuating pin facing away from the armature forms a linear measure that is set with respect to the axial thickness of the terminal piece in such a way that the actuating pin, when the collar makes contact with the terminal piece or with a component connected to it, protrudes from the terminal piece on its side facing away from the armature by a defined distance measure L3 advantageously makes it possible that in the press-in process the relevant length of the actuating pin is able to be set very precisely and as a function of the dimensions of the terminal piece so that part fluctuations or process fluctuations are able to be compensated. Since the solenoids used in the electromagnetic actuator often do not have a horizontal force-path profile, but are rather implemented having a position-dependent force, the distance measure L3 determines the level of magnetic force and thus the precision of the pressure ramp to be set of a hydraulic pressure-regulating valve. In the electromagnetic actuator according to the present invention, the distance measure L3 may be set very precisely and advantageously individually.

An advantageous exemplary embodiment provides a pole tube inserted into the central clearance of the coil form, which pole tube has at its outer circumference a clearance, the armature being supported in the pole tube in sliding fashion and an end of the pole tube facing the armature on the side of the terminal piece having a yoke that is developed in one piece on the pole tube, a through hole being developed in the yoke, the diameter of which is dimensioned in such a way that the separator is movable back and forth in the through hole. The yoke and the armature advantageously form mutually facing pole faces, whose maximum approach is limited by the length of the separator when making contact with the terminal piece.

The electromagnetic actuator-is particularly advantageously suited for use in an electromagnetic pressure-regulating valve, in particular for setting a hydraulic pressure in a hydraulic line of a motor vehicle transmission.

DETAILED DESCRIPTION OF THE INVENTION

Figure 1:
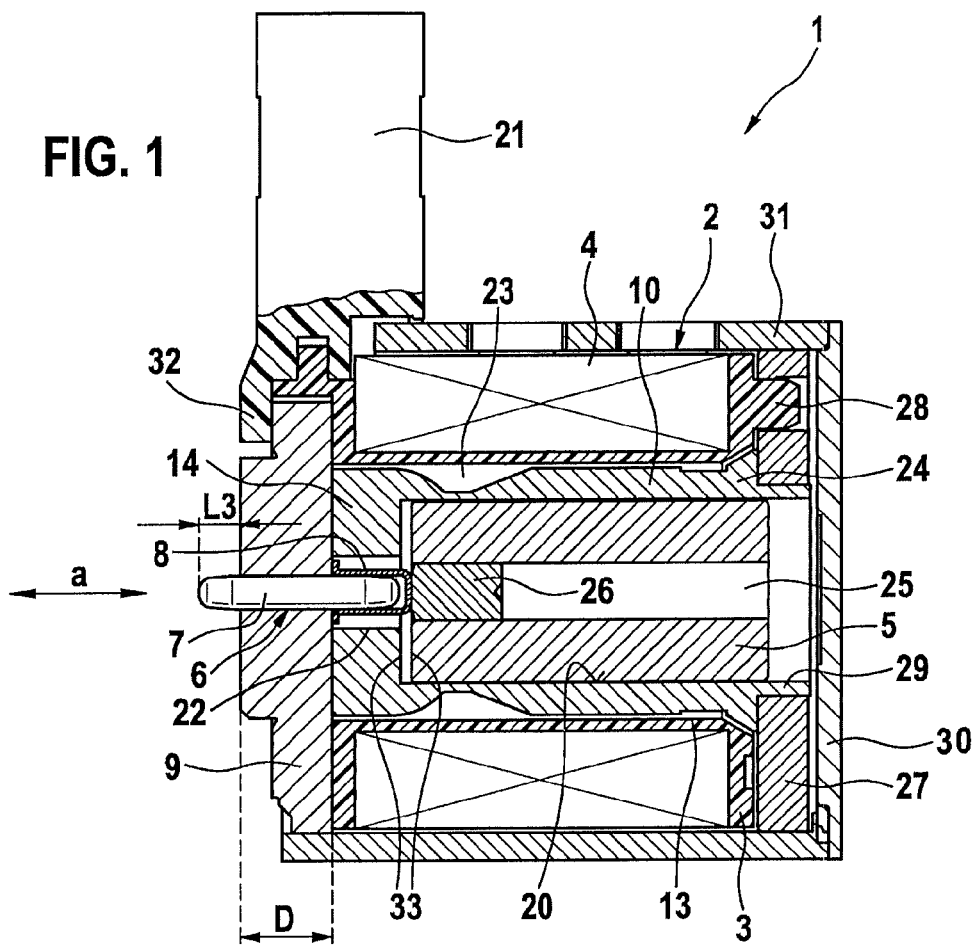
FIG. 1 shows an exemplary embodiment for an electromagnetic actuator according to the invention having a solenoid including a pole tube.

FIG. 1 shows an electromagnetic actuator, which may be used preferably for controlling a slide valve (not shown) for a hydraulic transmission clutch. Such a combination of an electromagnetic actuator and a slide valve is known for example from published international patent application document WO 2011/012366 A1, so that no further details will be provided here. The electromagnetic actuator, however, may also be used to actuate another actuator, for example to actuate a shift valve in seat-type construction.

As may be seen in FIG. 1, the electromagnetic actuator includes a solenoid 1, which is made up of a magnetic coil 2 and an armature 5, and which preferably has a pole tube 10. Magnetic coil 2 has a coil form 3 bearing a coil winding 4, which is developed for example rotationally symmetrically with respect to an axial direction a. Coil form 3 has an electrical terminal 21 projecting from it in the radial direction for example.

Coil form 3 has a preferably cylindrical central clearance 13, which penetrates the coil form completely. In the exemplary embodiment shown here, a magnetic pole tube 10 is inserted into central clearance 13. Pole tube 10 has a cylinder sleeve that has a clearance 23 on its outer circumference. This clearance 23 influences the magnetic flux through pole tube 10. Pole tube 10 combines two components used in older solenoids into one single component, that is, a magnet core for radially feeding the magnetic flux into an armature 5 having a pole core, which acts as the magnetic pole complementary to the armature. Clearance 23 is developed for example as a V-shaped groove and prevents a magnetic short circuit. The magnetic iron cross-section reduced in this manner in the clearance or groove already enters a state of saturation in response to low coil currents and thereby acts like an air gap between a magnet core and a pole piece. The exemplary embodiment having the pole tube is to be regarded as a preferred specific embodiment. The design approach according to the present invention, however, is not limited to this and may also be used in solenoids having no pole tube.

Pole tube 10 has a cylinder sleeve having an inner clearance 20, which penetrates pole tube 10 up to a magnet yoke 14, which is developed on the left end of the pole tube shown in FIG. 1. Magnetic yoke 14 has a through hole 22. In inner clearance 20 of pole tube 10, a cylindrical armature 5 is supported in a sliding manner. Armature 5 in turn has a central inner bore 25, into which an armature bolt 26 is pressed. Armature 5 moves back and forth in inner clearance 20 of pole tube 10 as a function of the electromagnetic force of magnetic coil 2 and the counteracting forces acting on armature 5 via an actuating element 6 and, possibly, a spring (not shown).

A pole disk 27 is mounted on pole tube 10 on the right front-side end of coil form 3 in FIG. 1. Pole disk 27 rests on the pole tube on a conically projecting end area 24 of the pole tube. Coil form 3 in turn engages by a projection 28 into pole disk 27. Pole disk 27 has a central circular clearance, through which a collar 29 of pole tube 10, which collar 29 surrounds inner clearance 20, engages. Armature 5 may be simply inserted from the right side in FIG. 1 into inner clearance 20. Coil form 3 is surrounded by a housing jacket 31, which is closed on its right end in FIG. 1 by a cover 30 covering pole disk 27.

On the left end of coil form 3 in FIG. 1, a terminal piece 9 is mounted on the front side of coil form 3, which overreaches central clearance 13. Terminal piece 9 forms a magnetic flow disk and is developed essentially preferably in a disk-shaped manner having an axial thickness D. A projection 32 of the plastic casing of electrical terminal 21 engages around terminal piece 9 and thus fixes it in position on coil form 3. Disk-shaped terminal piece 9 contains a through-bore that forms a sliding bearing for actuating element 6.

Figure 2:
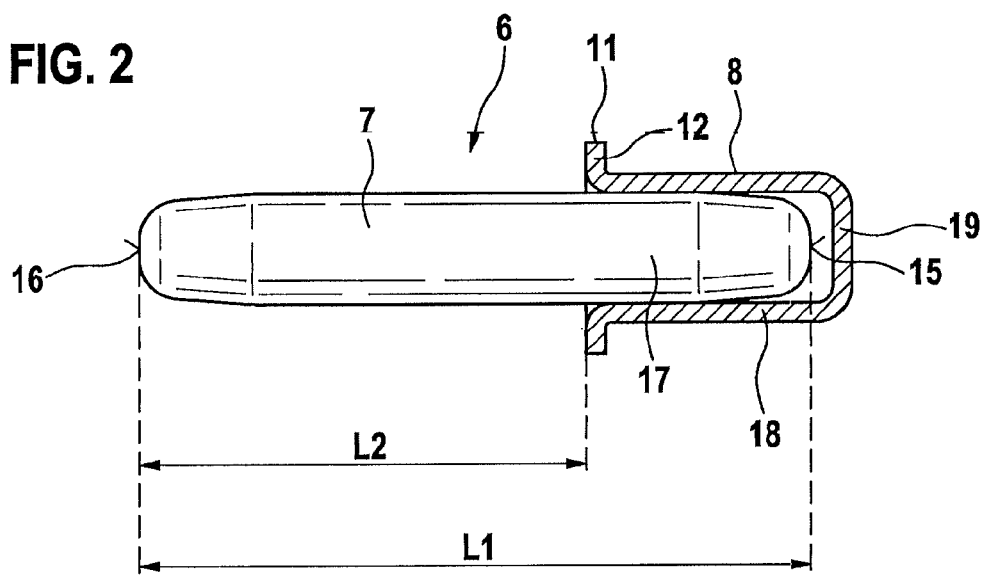
FIG. 2 shows the structure of the actuating element from FIG. 1 on the basis of an enlarged detail representation.

As may be seen better in FIG. 2, actuating element 6 is developed in two parts and includes an actuating pin 7 and a separator 8. Actuating pin 7 is preferably formed by a commercially available needle roller (long cylindrical rolling element) manufactured for use in needle roller bearings, which are especially robust and cost-effective. The actuating pin is in particular made from hardened steel. The ends of the actuating pin are preferably rounded off, as may be seen clearly in FIG. 2. The actuating pin has a length L1 between a first end 16 and a second end 15 facing away from the first end 16 in the axial direction a. A portion of the geometric extension of actuating pin 7 before second end 15 forms an end section 17. A cup-shaped separator 8 is pressed or shrunk onto this end section 17. Cup-shaped separator 8 is preferably manufactured as a deep-drawn part from non-magnetic material and has a cylinder sleeve 18, a bottom 19 and a laterally projecting collar 12 on its end facing away from bottom 19. The cup-shaped separator is preferably made from non-magnetic steel.

Pressing separator 8 onto actuating pin 7 creates a composite component forming actuating element 6, in which separator 8 and actuating pin 7 are fixedly connected to each other. When actuating pin 7 is pressed on, a measure of length L2 is thereby set between the end 16 of actuating pin 7 that is not inserted into separator 8 and collar 12. The measure of length L2 is set with respect to the axial thickness D of terminal piece 9 in such a way that actuating pin 7, when collar 12 makes contact with terminal piece 9 or a component connected thereto, protrudes from terminal piece 9 by a defined distance measure L3 on the side of terminal piece 9 facing away from armature 5, as may be seen clearly especially in FIG. 1.

FIG. 1 shows that armature 5 is pulled in pole tube 10 to the left toward yoke 14 when the magnetic coil is actuated. This results in an approach of the mutually facing pole faces 33 of yoke 14 and armature 5, and armature 5 comes into contact with armature bolt 26, which is press-fit fixedly in the armature, on the bottom 19 of separator 8 and moves the latter to the left in FIG. 1 until collar 12 makes contact with terminal piece 9 as shown. The actuating pin 7 fixedly connected to separator 8 is thereby shifted in its bearing bore on terminal piece 9 to the left until is protrudes by distance measure L3 from terminal piece 9 on the side of terminal piece 9 facing away from the armature. In this position, actuating pin 7 cannot be shifted further to the left, and armature 5 now presses separator 8 with collar 12 against terminal piece 9. The non-magnetic separator 8 thus separates pole faces 33 of yoke and armature. Since separator 8 is made of non-magnetic material, a magnetic adhesion on magnetic terminal piece 9 or armature 5 is prevented. Separator 8 advantageously has an elasticity to dampen the shock when making contact with terminal piece 9. FIG. 1 shows that the diameter of through hole 22 of yoke 14 of pole tube 10 is of such a size that separator 8 including laterally protruding collar 12 may be moved readily back and forth within it. Distance measure L3 is required in order for example to shift a slide piston in a pressure-regulating valve. This slide piston may be spring-loaded, for example, such that when solenoid 1 is switched off the spring-loaded slide piston presses the actuator pin together with the separator to the right in FIG. 1, and armature 5 is shifted back into its initial position. This resetting may also occur in a different manner however.

It is to be understood that it is not necessary for collar 12 of separator 8 to make contact with terminal piece 9. Rather, it is also possible for this collar to make contact with an intermediate part (not shown), for example a disk or a protrusion of pole tube 10. Instead of a cup-shaped separator, a differently configured separator may be used as well. Collar 12 may possibly be replaced by a lateral nub or protrusion on the separator. Instead of the pole tube, another structure of the solenoid having a magnet core, a pole body and a sleeve may be selected, in which the armature is situated in sliding fashion.

What is claimed is:

1. An electromagnetic actuator, comprising:
a magnetic coil, which has a coil form and a coil winding situated on the coil form, wherein the coil form has a central clearance extending in an axial direction;
an armature slidably situated in the central clearance;
a terminal piece situated on an axial end of the coil form; and
an actuating element supported in the terminal piece, the actuating element being slidable in the axial direction of the coil form;
wherein the armature is configured to be movable by an actuation of the magnetic coil such that a force applied by the armature of the electromagnetic actuator is transmitted to the actuating element, and wherein the actuating element is configured in two parts and has (i) an actuating pin supported in the terminal piece and (ii) a separator which is connected in a fixed manner to the actuating pin on an end section of the actuating pin protruding from the terminal piece in the direction of the armature and on which the armature acts when the magnetic coil is actuated,
wherein the separator is made from a non-magnetic material, and
wherein the actuating pin is not fixedly connected to the armature and includes a bearing independently of a bearing of the armature.

2. The electromagnetic actuator as recited in claim 1, wherein the separator is configured in the form of a cup.

3. The electromagnetic actuator as recited in claim 1, wherein the separator has at least one laterally projecting shoulder which limits the maximum displacement path of the actuating pin in the terminal piece by making contact with one of the terminal piece or a component connected to the terminal piece when the separator is acted upon by the armature.

4. The electromagnetic actuator as recited in claim 2, wherein the actuating pin is inserted by the end section protruding from the terminal piece in the direction of the armature into the cup-shaped separator.

5. The electromagnetic actuator as recited in claim 4, wherein the cup-shaped separator is one of pressed or shrunk onto the actuating pin.

6. The electromagnetic actuator as recited in claim 1, wherein the electromagnetic actuator is part of an electromagnetic pressure-regulating valve for setting a hydraulic pressure in a hydraulic line.

7. The electromagnetic actuator as recited in claim 1, wherein the non-magnetic material includes non-magnetic steel.

8. An electromagnetic actuator, comprising:
a magnetic coil, which has a coil form and a coil winding situated on the coil form, wherein the coil form has a central clearance extending in an axial direction;
an armature slidably situated in the central clearance;
a terminal piece situated on an axial end of the coil form; and
an actuating element supported in the terminal piece, the actuating element being slidable in the axial direction of the coil form;
wherein the armature is configured to be movable by an actuation of the magnetic coil such that a force applied by the armature of the electromagnetic actuator is transmitted to the actuating element, and wherein the actuating element is configured in two parts and has (i) an actuating pin supported in the terminal piece and (ii) a separator which is connected in a fixed manner to the actuating pin on an end section of the actuating pin protruding from the terminal piece in the direction of the armature and on which the armature acts when the magnetic coil is actuated,
wherein the separator is made of a non-magnetic material,
wherein the separator is configured in the form of a cup,
wherein the actuating pin is inserted by the end section protruding from the terminal piece in the direction of the armature into the cup-shaped separator,
wherein the cup-shaped separator is one of pressed or shrunk onto the actuating pin, and
wherein the cup-shaped separator has a cylinder sleeve, a bottom, and, on an end facing away from the bottom, a laterally projecting collar which limits the maximum displacement path of the actuating pin in the terminal piece by making contact with one of the terminal piece or a component connected to the terminal piece when the separator is acted upon by the armature.

9. The electromagnetic actuator as recited in claim 8, wherein the actuating pin has a first length and the cup-shaped separator is one of pressed or shrunk onto the actuating pin to such an extent that the distance between the collar and an end of the actuating pin facing away from the armature forms a measure of a second length that is set with respect to the axial thickness of the terminal piece in such a way that the actuating pin protrudes from the terminal piece by a defined third distance on the side of the terminal piece facing away from the armature when the collar makes contact with the one of the terminal piece or the component connected to the terminal piece.

10. An electromagnetic actuator, comprising:
a magnetic coil, which has a coil form and a coil winding situated on the coil form, wherein the coil form has a central clearance extending in an axial direction;
an armature slidably situated in the central clearance;
a terminal piece situated on an axial end of the coil form;
an actuating element supported in the terminal piece, the actuating element being slidable in the axial direction of the coil form;
wherein the armature is configured to be movable by an actuation of the magnetic coil such that a force applied by the armature of the electromagnetic actuator is transmitted to the actuating element, and wherein the actuating element is configured in two parts and has (i) an actuating pin supported in the terminal piece and (ii) a separator which is connected in a fixed manner to the actuating pin on an end section of the actuating pin protruding from the terminal piece in the direction of the armature and on which the armature acts when the magnetic coil is actuated;
a pole tube inserted into the central clearance of the coil form, wherein the pole tube has at the outer circumference a clearance, the armature is slidably supported in the pole tube, and an end of the pole tube facing the armature on the side of the terminal piece has a yoke configured as one piece on the pole tube, and wherein a through hole is provided in the yoke, the diameter of the through hole being dimensioned in such a way that the separator is movable back and forth in the through hole.

* * * * *